(12) United States Patent
Amiel et al.

(10) Patent No.: US 10,959,094 B2
(45) Date of Patent: Mar. 23, 2021

(54) METHOD OF REPLACING AT LEAST ONE AUTHENTICATION PARAMETER FOR AUTHENTICATING A SECURITY ELEMENT AND CORRESPONDING SECURITY ELEMENT

(71) Applicant: THALES DIS FRANCE SA, Meudon (FR)

(72) Inventors: Patrice Amiel, Gemenos (FR); Michel Endruschat, Gemenos (FR); Sébastien Ponard, Gemenos (FR); Gabriel Pereira, Gemenos (FR); Jean-Yves Fine, Gemenos (FR); François Zannin, Gemenos (FR); Michel Martin, Gemenos (FR); Caroline Durant Dinet, Gemenos (FR); Xavier Berard, Gemenos (FR)

(73) Assignee: THALES DIS FRANCE SA, Meudon (FR)

(*) Notice: Subject to any disclaimer, the term of this patent is extended or adjusted under 35 U.S.C. 154(b) by 112 days.

(21) Appl. No.: 15/737,438

(22) PCT Filed: Jun. 23, 2016

(86) PCT No.: PCT/EP2016/064616
§ 371 (c)(1),
(2) Date: Dec. 18, 2017

(87) PCT Pub. No.: WO2016/207316
PCT Pub. Date: Dec. 29, 2016

(65) Prior Publication Data
US 2018/0176778 A1 Jun. 21, 2018

(30) Foreign Application Priority Data
Jun. 25, 2015 (EP) .................................... 15306008

(51) Int. Cl.
H04W 12/06 (2021.01)
H04W 12/04 (2021.01)
H04W 12/00 (2021.01)

(52) U.S. Cl.
CPC ....... H04W 12/06 (2013.01); H04W 12/0023 (2019.01); H04W 12/04 (2013.01)

(58) Field of Classification Search
CPC .. H04W 12/06; H04W 12/04; H04W 12/0023
See application file for complete search history.

(56) References Cited

U.S. PATENT DOCUMENTS

| 5,799,084 A | * | 8/1998 | Gallagher | ......... H04W 12/0017 380/248 |
| 6,173,174 B1 | * | 1/2001 | Jacobs | .................. H04W 12/06 380/247 |

(Continued)

FOREIGN PATENT DOCUMENTS

CN 101946536 A 1/2011

OTHER PUBLICATIONS

International Search Report (PCT/ISA/210) dated Aug. 8, 2016, by the European Patent Office as the International Searching Authority for International Application No. PCT/EP2016/064616.

(Continued)

*Primary Examiner* — Saleh Najjar
*Assistant Examiner* — Devin E Almeida
(74) *Attorney, Agent, or Firm* — Buchanan Ingersoll & Rooney PC

(57) ABSTRACT

A method of replacing an authentication parameter for authenticating a security element co-operating with a terminal includes storing in the security element a first authentication parameter; transmitting to a mobile network operator the first authentication parameter for the operator to record it in its authentication system; on occurrence of an event, (Continued)

having a remote platform transmit to the security element an indicator informing the security element that it is authorized to replace the first authentication parameter with a second authentication parameter if its authentication fails; on occurrence of the event, having the entity transmit to the operator a second authentication parameter to replace the first authentication parameter; and in the event of subsequent failure of the security element to connect to the mobile network and if the indicator is present at the security element, replacing the first authentication parameter with the second authentication parameter at the security element.

12 Claims, 1 Drawing Sheet

(56) References Cited

U.S. PATENT DOCUMENTS

| | | | | |
|---|---|---|---|---|
| 7,010,699 B1* | 3/2006 | Agarwal | ............... | H04W 12/06 |
| | | | | 726/5 |
| 7,099,476 B2* | 8/2006 | Chen | ............... | H04L 9/0891 |
| | | | | 380/270 |
| 9,098,958 B2* | 8/2015 | Joyce | ............... | G06Q 20/00 |
| 9,820,216 B1* | 11/2017 | Reeves | ............... | H04W 48/08 |
| 10,142,464 B1* | 11/2018 | Cairns | ............... | H04M 3/4365 |
| 2006/0121895 A1* | 6/2006 | Zou | ............... | H04L 63/0853 |
| | | | | 455/433 |
| 2006/0154647 A1* | 7/2006 | Choi | ............... | H04W 12/06 |
| | | | | 455/411 |
| 2008/0235386 A1* | 9/2008 | Oommen | ............... | H04L 9/0891 |
| | | | | 709/230 |
| 2010/0048175 A1* | 2/2010 | Osborn | ............... | H04L 63/08 |
| | | | | 455/411 |
| 2011/0004758 A1* | 1/2011 | Walker | ............... | H04L 63/062 |
| | | | | 713/168 |
| 2011/0099613 A1* | 4/2011 | Koraichi | ............... | H04W 12/0609 |
| | | | | 726/6 |
| 2012/0155647 A1* | 6/2012 | Zhang | ............... | H04L 9/0822 |
| | | | | 380/279 |
| 2018/0076958 A1* | 3/2018 | Narimoto | ............... | H04L 9/0819 |

OTHER PUBLICATIONS

Written Opinion (PCT/ISA/237) dated Aug. 8, 2016, by the European Patent Office as the International Searching Authority for International Application No. PCT/EP2016/064616.

Office Action dated Apr. 3, 2020 in corresponding Chinese Patent Application No. 201680037130.X, 9 pages.

* cited by examiner

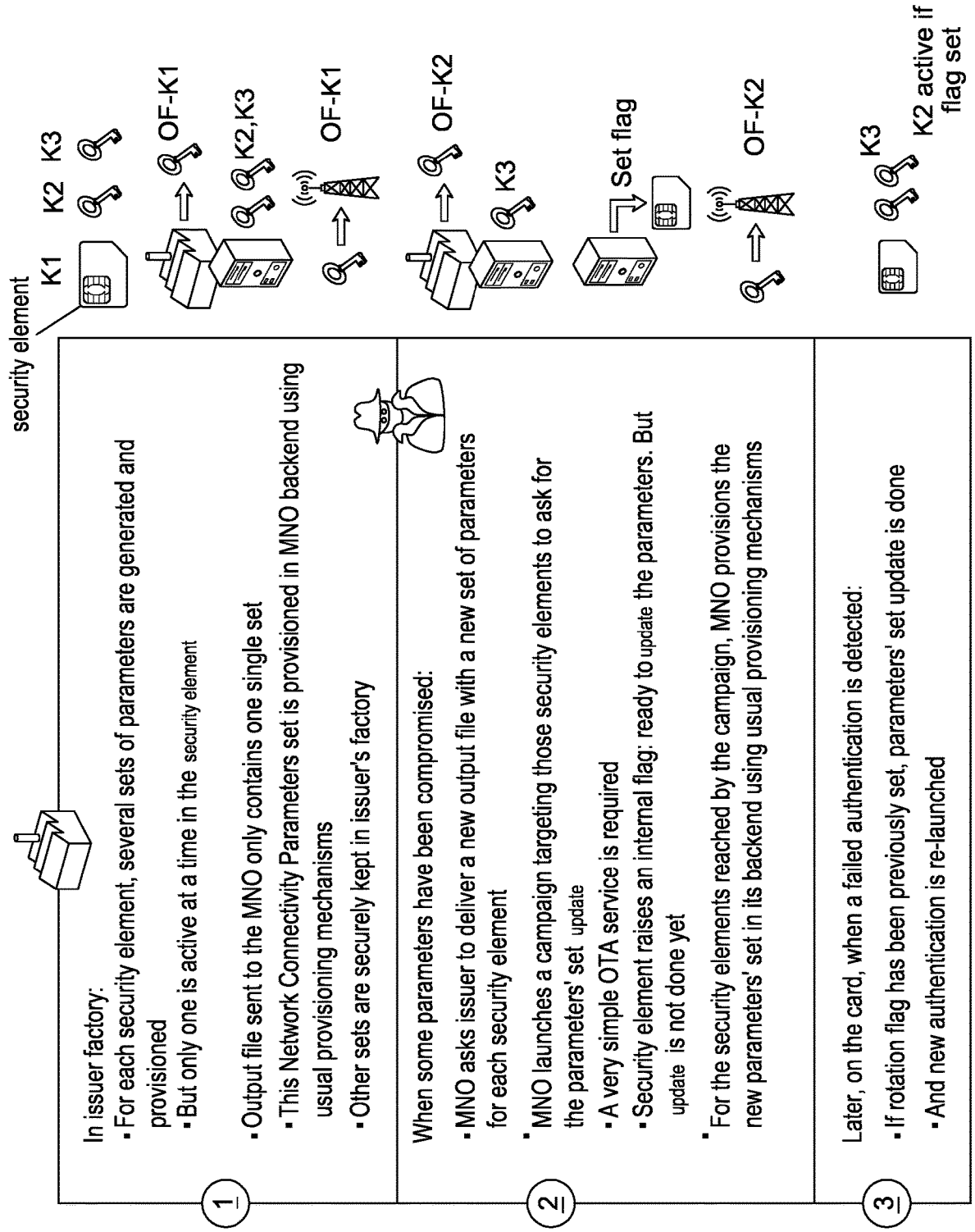

METHOD OF REPLACING AT LEAST ONE AUTHENTICATION PARAMETER FOR AUTHENTICATING A SECURITY ELEMENT AND CORRESPONDING SECURITY ELEMENT

The present invention relates to telecommunication and in particular to the authentication of a security element cooperating with a terminal, like for example in a 2G (GSM), 3G (UMTS), 4G (LTE), IMS or CDMA network.

The security element is typically a SIM or UICC card that can be extracted from the terminal. It can also be a so called eUICC that is embedded (soldered) in the terminal or removable there from with difficulty. The terminal is typically a mobile phone, a smartphone, a PDA, . . . .

When connecting to a telecommunication network, a security element has to authenticate itself. The authentication consists in sending, from the security element to the backend infrastructure of the mobile telecommunication network of the operator (the 3GPP or 3GPP2 HLR and the 3GPP AuC for 2G/3G/4G networks, and in the 3GPP2 Ac for CDMA networks), the result of a computation of a challenge sent from the network to the UICC, this challenge being computed thanks to at least an authentication parameter stored in a secure memory of the security element. This result is for example a SRES computed by the A3 algorithm at the level of the security element in a 2G, 3G or 4G network, thanks to a secret key Ki.

The secret key Ki constitutes an authentication parameter and is stored in the security element during the personalization stage of this security element, for example in a building of the manufacturer of the security element (personalization process). The secret key Ki is also sent by this manufacturer to the mobile network operator (MNO), in a so called output file. The output file contains the secret key Ki and other parameters that are used by the MNO to authenticate the security element, in function of the algorithm used by the MNO and the security element for authentication purposes. The MNO stores this output file in his backend infrastructure at subscription provisioning time (the HLR is provisioned with some data comprised in the output file) in order to be able to authenticate the security element when the latter tries to connect to the MNO's network. This mechanism exists in 2G networks that only authenticate the security element but also in 3G or 4G networks where mutual authentications are realized.

When a security element personalization center delivers a security element to a MNO, an output file is generated in his factories and provided via Internet (through a secured channel) to the MNO. Among many other information, this output file contains the network authentication secrets (IMSI, Ki, . . . ). In the following, we will consider that at least one authentication secret is transmitted to the MNO, this authentication secret being generally hereafter called an authentication parameter.

A problem is that a thief can stole output files by compromising the security of the Internet connection between the security element personalizer and the MNO. The output files can also be stolen at the level of the MNO's network. As soon as an output file has been compromised, then it is possible for the attacker to spy the network exchanges and thus listen to the voice calls or the data exchanges. This leads to a privacy problem and, if the theft is publicly revealed, leads to a churn of MNO at the initiative of the end user who loses his confidence in his MNO.

MNOs don't have the capability to know if security elements have been compromised, and if yes, which ones.

As a consequence, if they want to still provide the same level of security regarding the voice and data communications to their end users, they have today no other choice than replacing their security elements, which is a very important cost for them. When the security elements are embedded in terminals (eUICCs), these security elements cannot be replaced (for example when they are soldered in the terminals) and this represents a major concern since the entire terminals have then to be replaced if their integrity wants to be ensured.

Moreover, some MNOs could be simply interested in having a capability to update the authentication parameters of their security elements through a secure method, as a preventive action, or to provide very specific services to some specific customers (VIP, politicians, governments, . . . ).

Authentication parameters that are used to open a secure communication between a connected device and the MNO network are provisioned in the two following locations:
  Inside the security element (during factories personalization/production) or through a RPS (Remote Personalization System) method, like for example when downloading via OTA a full subscription to a security element;
  In the MNO backend infrastructure (authentication system of the MNO); more precisely in the 3GPP or 3GPP2 HLR and the 3GPP AuC for 2G/3G/4G networks, and in the 3GPP2 Ac for CDMA networks (at subscription provisioning time, thanks to the output files provided by the security element manufacturer/personalizer).

Authentication of the connected terminal (or security element) can only happen if those parameters' sets are identical in the security element and in the HLR/AuC/Ac (shared secrets).

In order to update those authentication parameters, it is mandatory to update the two entities (security element and HLR/AuC/Ac) synchronously and in real time. If not, the connected device will no longer be able to authenticate to the network. This synchronous update is however very complex to perform as the HLR/AuC/Ac and the OTA servers (the one able to perform OTA updates of SIM cards or security elements in general) are not located on the same area of the MNO backend infrastructure. Those systems are deployed on different security levels, without possibility to establish direct links.

Moreover, the OTA protocol used to update SIM cards:
  Requires OTA keys that may also have been compromised;
  For some of those commonly used protocols (SMS), does not provide enough reliability on the success of update campaigns.

As a consequence, the risk to get an updated HLR/AuC/Ac, but a not updated security element may be high. In case it occurs, the authentication parameters are simply un-usable and the connected device will no longer be able to connect to the network with this security element. Only a security element (SIM card for example) renewal will allow the end user to get back in the MNO network.

This results in a very bad end user experience (even worth than having a compromised SIM) as the end user can no longer use his connected device, and needs to contact the MNO or go to a retail store. Consequence could be an increase of the churn effect for MNO's.

The problematic detailed above is also applicable to IMS authentication, GBA authentication, EAP-SIM authentication, etc, with other servers to be updated synchronously with the security element (card or embedded card).

The technical problem to solve is consequently to be able to update both the security element and the HLR/AuC/Ac servers without any risk of parameters de-synchronization, in a very secure manner and without introducing exploitable back-doors for an attacker.

The invention proposes a solution to perform an Over-The-Air (OTA) update of the authentication parameters of security elements deployed on the field.

This solution consists in a method of replacing at least one authentication parameter for authenticating a security element co-operating with a terminal, this authentication parameter enabling an authentication system of a mobile network to authenticate the security element, the mobile network being operated by a mobile network operator, this method consisting in:

A—Having an entity store in the security element a first authentication parameter;

B—Having this entity transmit to the mobile network operator the first authentication parameter so that the operator can record it in its authentication system for authenticating the security element;

C—On occurrence of an event, having a remote platform transmit to the security element an indicator informing the security element that it is authorized to replace the first authentication parameter with a second authentication parameter if its authentication fails with the authentication system the next time it attempts to connect to the mobile network;

D—On occurrence of the event, having the entity transmit to the operator a second authentication parameter so as to enable the operator to replace the first authentication parameter by the second authentication parameter in its authentication system;

E—In the event of subsequent failure of the security element to connect to the mobile network and if the indicator is present at the security element, replacing the first authentication parameter with the second authentication parameter at the security element so that the security element can authenticate itself with the mobile network by means of the second authentication parameter.

In a first embodiment, the method consists in storing in the security element a plurality of authentication parameters, the first authentication parameter being placed at the head of a list of authentication parameters, and step E consists in replacing the first authentication parameter with the second authentication parameter, the second authentication parameter being ranked in the list immediately after the first authentication parameter.

In a second embodiment, the method consists in storing in the security element a plurality of authentication parameters and step C further consists in transmitting to the security element the rank in the list of the second authentication parameter to be used at the next attempt to connect to the mobile network, if the indicator is present.

In a third embodiment, the second authentication parameter is computed by the security element on the basis of a seed and of a diversifier.

The diversifier can be transmitted to the security element during step C.

Preferably, the second authentication parameter is computed by the security element on the basis of the first authentication parameter and of an identifier of the security element.

Advantageously, the entity is a manufacturer of the security element.

In a preferred embodiment, the indicator is transmitted to the security element via the mobile network operator.

The security element is preferably constituted by any one of the following elements:
  A Subscriber Identity Module (SIM) card;
  A Universal Integrated Circuit Card (UICC); or
  An embedded UICC (eUICC).

The invention also concerns a security element comprising a first authentication parameter to a mobile network, this first authentication parameter enabling an authentication system of the mobile network to authenticate the security element, the security element comprising:

Means for storing an indicator informing the security element that it is authorized to replace the first authentication parameter by a second authentication parameter if its authentication fails with the authentication system the next time it attempts to connect to the mobile network;

Means for replacing the first authentication parameter by the second authentication parameter if the security element fails to connect to the mobile network with the first authentication parameter, these means for replacing being activated if the indicator is present at the security element, so that the security element can authenticate itself with the mobile network by means of the second authentication parameter.

Preferably, the security element comprises a memory storing the second authentication parameter.

Advantageously, this memory stores a plurality of authentication parameters.

Alternatively, the security element comprises computing means for computing the second authentication parameter after having received the indicator.

The present invention will be better understood in regard of the description of the unique drawing showing the steps of the method of the invention where a security element supplier provides security elements to a MNO.

In this FIGURE, three steps are represented:

The first step consists in generating several sets of authentication parameters for the same security element. Here, three sets K1, K2 and K3 are generated and loaded in a secured memory of the security element. However, only one set K1 is active, i.e. the security element can only authenticate itself to the network by using the set K1. The sets K2 and K3 are "sleeping" sets and can be activated (explanation below) later. A key set comprises at least an authentication parameter, for example the key Ki. The output file OF-K1 comprising the key set K1 is sent to the MNO and can be provisioned in the MNO's backend elements as usual. The other sets K2 and K3 are securely kept in issuer's factory, for example in a KMS and not transmitted to the MNO. These sets are therefore kept secret and cannot be compromised by a third party (attacker).

When the user of the terminal comprising the security element comprising the set K1 tries to connect to the MNO's network, he will be authenticated, as usual, since the K1 set is present and activated in the security element and in the network (authentication system).

The second step occurs when an event occurs. This event can be for example:

The issuer or the MNO feels that a security problem has occurred (the set of parameters K1 can have been stolen or compromised);

The MNO decides that a security campaign of changing the sets of parameters has to be launched (for example on a monthly basis);

The MNO wants to perform some preventive update of the parameters in security elements;

A VIP or government asks for new sets of parameters for security reasons, . . . .

At this second step, at the request of the MNO or at the initiative of the issuer, the issuer delivers a new output file to the MNO. This output file cannot have been compromised since it was securely stored in issuer's premises (in a KMS/HSM for example). The new output file (OF-K2) comprises the key set K2 already comprised in the security element. The key set K3 is kept confidential in issuer's premises.

The MNO can then launch a campaign targeting the security elements that have to change their keysets. In the FIGURE, the secure element having the keyset K1 has to change the authentication key K1. For that, a simple OTA campaign has to be launched. It consists in setting, by a remote platform (like an OTA platform, for example belonging to the issuer or to the MNO), an indicator (flag) in the security element. The remote platform transmits to the security element an indicator informing the security element that it is authorized to replace the current (first) authentication parameter with a second authentication parameter if its authentication fails with the authentication system the next time it attempts to connect to the mobile network. The security element continues to keep the keyset K1 as active (no replacement of K1 is done yet) but is ready to replace it by a new one.

For the security elements reached by the campaign, the MNO provisions the new keysets in his backend infrastructure using its usual provisioning mechanism. The MNO replaces the first authentication parameter by the second authentication parameter in its authentication system. When a new authentication to the network will be performed by the connected device, the authentication will fail as the active parameters on the security elements are still the initial ones, whereas the active parameters on the MNO backend are the new ones.

The third step thus consists for the security element to detect that he is unable to connect to the network: his authentication has failed. In this event, the security element checks if the flag is present. If the flag is not present, the security element keeps continue to authenticate with the keyset K1. If the flag is present, the security element replaces the first authentication parameter K1 with the second authentication parameter K2 so that the security element can authenticate itself with the mobile network by means of the second authentication parameter K2 (K2 is active at the level of the network and at the level of the security element). If authentication succeeds with K2, the flag is then reset and a new authentication is re-launched. It is also possible to try to authenticate to the network with the second parameter K2 and, if successful, replace K1 by K2 and reset the flag.

Later on, it will be possible to replace the key set K2 by the key set K3 by using the same mechanism.

In more details, the authentication process starts with the sending of a challenge (a random+the crypto signature of this random+other data) by the network to the connected device. The security element is first responsible to authenticate the network by checking the crypto signature. If the active parameters are not the good ones, the re-computation of the crypto signature will not match: authentication will fail on the security element part. However, as part of the invention, if the replacement mechanism has been previously activated, the security element can immediately try to compute the crypto signature with another of its provisioned parameters. If the new crypto signature computation matches, the used parameter's set becomes the new active one, and the authentication process can continue with those parameters: the security element will then send a challenge that will enable the network to authenticate the security element (in case of mutual authentication).

In the preceding description, the keysets are stored in a list, the first authentication parameter K1 being placed at the head of this list (and being automatically activated) and it is replaced (when the flag is active and authentication fails) by the second authentication parameter K2 being in the list immediately after the first authentication parameter K1. The K3 authentication parameter is ranked at #3 in the list.

Such a list can for example comprise twelve different authentication parameters (such that the MNO can change the authentication parameters on a monthly basis, the list being circular such that after K12, K1 will be selected again, and that no authentication parameter will be used more than 1 month in a year).

At the occurrence of the event (second step), it is also possible to indicate to the security element which authentication parameter he is authorized to use later on by indicating the rank in the list of the authentication parameter to be used at the next attempt to connect to the mobile network, if the indicator is present. This means that as part of the OTA command sent to the security element for activating the replacement mechanism, the identifier of the new parameters' set to be used may be provided.

Another way to handle the authentication parameters is to compute the authentication parameter to be used in case of authentication failure by using a seed (master key) and a diversifier, the seed being installed in the security element during manufacturing/personalization and the diversifier being sent to the security element during the campaign.

An alternative consists in computing the second authentication parameter at the level of the security element on the basis of the first authentication parameter and of an identifier of the security element, for example its Integrated Circuit Card Identifier (ICCID).

The entity that stores the authentication parameters in the security element and transmits them to the MNO is preferably the manufacturer (or personalization factory) of the security element. However, in case of remote personalization of the secure element, another entity can realize these functions, for example an operator of a server managing security elements. This operator can establish links with a plurality of MNOs, for downloading complete subscription profiles in security elements already in the field. An end-user can thus request the download of keys, programs and data from different MNOs, thus allowing him to have multiple subscriptions on his device (possibly obtained from different MNOs).

In order to be inter-operable, the indicator (flag) sent to the security element can be sent by the manufacturer of the security element to the MNO. It is in this case important that the flag be protected by an information (key) that is not comprised in the output file (because this information can also have been hacked previously by an attacker). This key has therefore to be also kept secret in the KMS/HSM of the manufacturer. The flag can for example be sent over OTA or Wifi in an OTA command.

The method according to the present invention applies to any security elements, among them:

Sim cards
UICCs cards
embedded UICCs (eUICCs)

The invention introduces a new OTA command for the activation of the replacement mechanism. As this might open a new attack vector on the security element, the invention also includes an additional security protection:

A key shall have been provisioned in the security element at manufacturing time, named "replacement mechanism protection key". This key will never exit the security element issuer factory or personalization center.

When the MNO asks for the delivery of new parameters' sets, the security element issuer factory is also responsible to compute the payload of the OTA command to be sent to the security element (the one used in the OTA campaign mentioned above). This OTA command is secured by the "replacement mechanism protection key" of the security element.

When receiving the OTA command, the security element shall verify the payload, using the "replacement mechanism protection key" provisioned at manufacturing time. If the verification is not successful, the replacement mechanism remains inactive.

A "failed payload check counter" may be implemented to increase the security level: The security element could become mute if the number of remaining available failed payload checks reaches 0.

As variants of the invention:

In order to enhance the reliability of the OTA protocol, it is also possible for the security element to send a message (e.g. a Mobile Originated SMS also called "MO SMS") to the server to acknowledge the activation of the replacement mechanism. MO SMS is sent only if the SMS received by the card has been authenticated (to avoid "premium number attacks", accordingly to last ETSI release 102.226 and 3GPP 31.115).

Parameters' set may either be used several times in the life of the SIM card (no limit on the number of change of the parameters' sets), or the reuse of parameter's set can be blocked/limited (when changing a parameters' set, the old set may be considered as "burned", meaning that it cannot be used any more. This means that if N parameters' set have been provisioned in the SIM card at manufacturing time, then a maximum of N−1 change can be performed).

Parameters' set can be stored in security element issuer factory as individual values: N parameters' set are securely stored per card. This results in an important number of data to be protected and stored in the security element issuer manufacturer backend system. Parameters' set can also be mutualized by storing only a "primary seed values" that can be used to dynamically re-compute the individual parameters' sets on demand.

Even on the security element, instead of provisioning the full parameters' set in factory, a similar "primary seed values" approach can be used: on-board key/parameters' set generation can be performed at replacement mechanism execution. As for any diversification algorithm, a diversifier needs also to be known by both parties: this diversifier can be part of the payload of the OTA command to be sent to the SE (the one used in the OTA Campaign mentioned above).

Note that if "primary seed values" are used both on server and client side, then the number of parameters' set that can be used in the card can become infinite (a new set is generated on demand, each time the replacement mechanism is triggered).

The advantages of the present invention are:
No secret/key is transported over the air
No automatic/real-time server to server interaction between OTA system and MNO backend (HLR/AuC/Ac)
No real time synchronization needed between the server systems.
Very simple OTA campaign
Works whatever the network generation (3GPP or 3GPP2 networks)
No risk of connectivity loss during the parameter change process The invention also concerns a security element comprising a first authentication parameter to a mobile network, this first authentication parameter enabling an authentication system of the mobile network to authenticate the security element, this security element comprising:

Means for storing an indicator informing the security element that it is authorized to replace the first authentication parameter by a second authentication parameter if its authentication fails with the authentication system the next time it attempts to connect to the mobile network;

Means for replacing the first authentication parameter by the second authentication parameter if the security element fails to connect to the mobile network with the first authentication parameter, these means for replacing being activated if the indicator is present at the security element, so that the security element can authenticate itself with the mobile network by means of the second authentication parameter.

The security element according to the invention comprises preferably a memory storing the second authentication parameter and advantageously a plurality of authentication parameters. The first parameter of rank 1 can be stored in a dedicated memory or in the same memory than the parameters of higher ranks.

Alternatively, the security element comprises computing means for computing the second authentication parameter after having received the aforementioned indicator.

The invention claimed is:

1. A method of replacing at least one authentication parameter for authenticating a security element co-operating with a terminal, said authentication parameter enabling an authentication system of a mobile network to authenticate said security element, said mobile network being operated by a mobile network operator, said method comprising:

A—Having an entity store in said security element a plurality of authentication parameters that form a circular ranked list of authentication parameters;

B—Having said entity transmit to said mobile network operator a first authentication parameter, of the plurality of authentication parameters, so that said mobile network operator can record it in its authentication system for authenticating said security element;

C—On occurrence of an event, having a remote platform transmit to said security element an indicator informing said security element that it is authorized to replace said first authentication parameter with a second authentication parameter if its authentication fails with said authentication system the next time it attempts to connect to said mobile network, wherein the second authentication parameter is a next authentication parameter after the first authentication parameter in the circular ranked list of authentication parameters, and wherein if the first authentication parameter is a last authentication parameter in the circular ranked list of authentication parameters, then the next authentication parameter is a head authentication parameter in the circular ranked list of authentication parameters;

D—On occurrence of said event, having said entity transmit to said mobile network operator a second authentication parameter so as to enable said mobile network operator to replace said first authentication parameter by said second authentication parameter in its authentication system, wherein the transmitted second authentication parameter is unique to said security element;

E—In the event of subsequent failure of said security element to connect to said mobile network and if said indicator is present at said security element, replacing said first authentication parameter with said second authentication parameter at said security element so that said security element can authenticate itself with said mobile network by means of said second authentication parameter.

2. A method according to claim 1, further comprising storing in said security element a plurality of authentication parameters and in that step C further comprises transmitting to said security element a rank in said circular ranked list of said second authentication parameter to be used at the next attempt to connect to said mobile network, if said indicator is present.

3. A method according to claim 1, wherein said second authentication parameter is computed by said security element on the basis of a seed and of a diversifier.

4. A method according to claim 3, wherein said diversifier is transmitted to said security element.

5. A method according to claim 1, wherein said second authentication parameter is computed by said security element on the basis of said first authentication parameter and of an identifier of said security element.

6. A method according to claim 1, wherein said entity is a manufacturer of said security element.

7. A method according to claim 1, wherein said indicator is transmitted to said security element via said mobile network operator.

8. A method according to claim 1, wherein said security element is constituted by any one of the following elements:
 A Subscriber Identity Module (SIM) card;
 A Universal Integrated Circuit Card (UICC); or
 An embedded UICC (eUICC).

9. Security element comprising a first authentication parameter to a mobile network, said first authentication parameter enabling an authentication system of said mobile network to authenticate said security element, comprising:

Means for storing a plurality of authentication parameters that form a circular ranked list of authentication parameters, wherein the first authentication parameter is from the circular ranked list of authentication parameters;

Means for storing an indicator informing said security element that it is authorized to replace said first authentication parameter by a second authentication parameter if its authentication fails with said authentication system the next time it attempts to connect to said mobile network, wherein the second authentication parameter is transmitted from an entity to a mobile network operator and is unique to the security element, wherein the second authentication parameter is a next authentication parameter after the first authentication parameter in the circular ranked list of authentication parameters, and wherein if the first authentication parameter is a last authentication parameter in the circular ranked list of authentication parameters, then the next authentication parameter is a head authentication parameter in the circular ranked list of authentication parameters;

Means for replacing said first authentication parameter by said second authentication parameter if said security element fails to connect to said mobile network with said first authentication parameter, said means for replacing being activated if said indicator is present at said security element, so that said security element can authenticate itself with said mobile network by means of said second authentication parameter.

10. Security element according to claim 9, further comprising a memory storing said second authentication parameter.

11. Security element according to claim 10, wherein said memory stores the plurality of authentication parameters.

12. Security element according to claim 9, further comprising computing means for computing said second authentication parameter.

* * * * *